United States Patent Office 2,837,384
Patented June 3, 1958

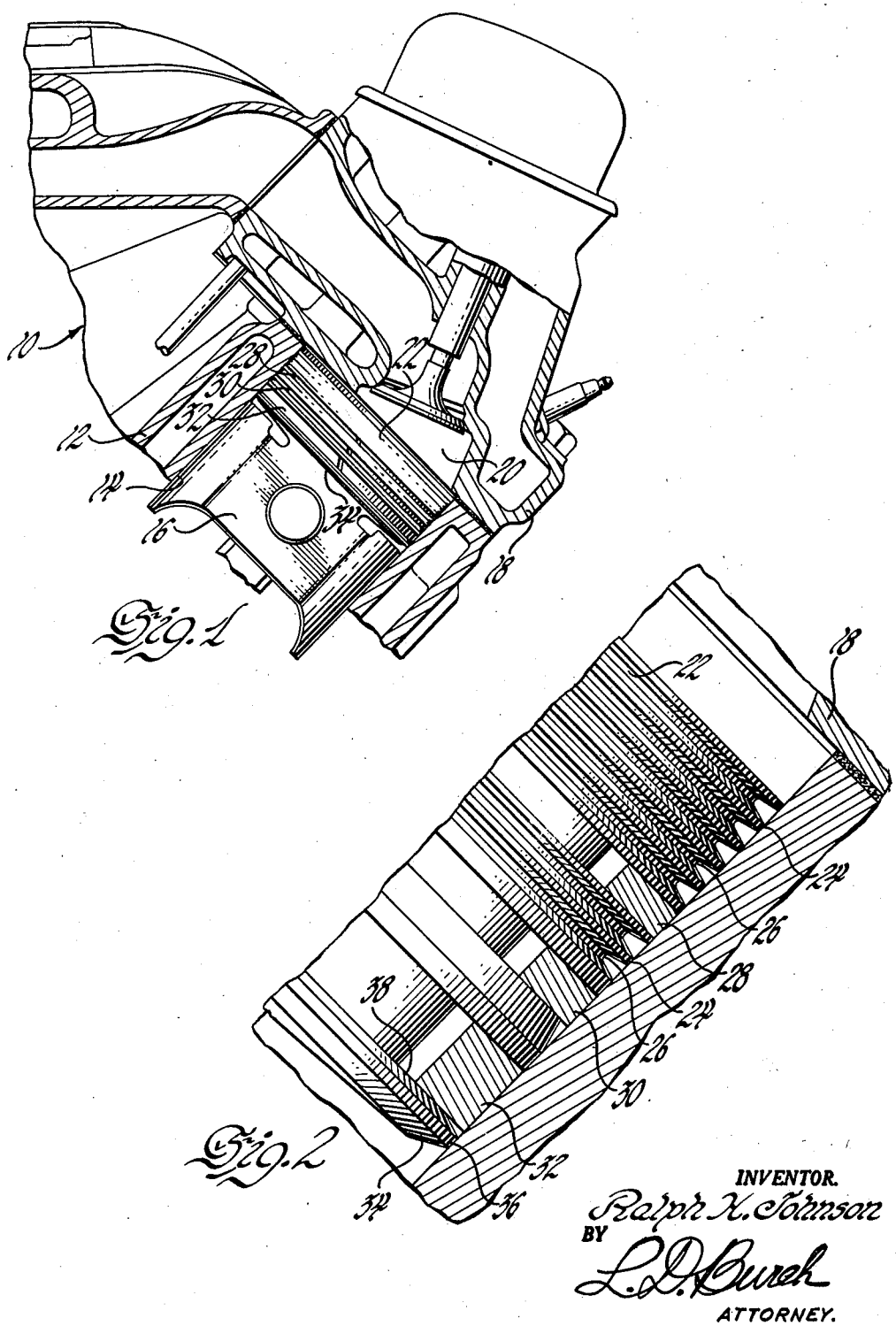

2,837,384

PISTON

Ralph H. Johnson, Detroit, Mich., assignor to General Motors Corporation, Detroit, Mich., a corporation of Delaware Application November 7, 1956, Serial No. 620,858

5 Claims. (Cl. 309—10)

The invention relates to an internal combustion engine piston, and more particularly to a land formed on such a piston.

Internal combustion engine pistons are ordinarily provided with one or more oil rings which are usually located on the lower surfaces of the piston skirt or its equivalent. While the oil ring functions to remove excess oil from the cylinder walls and prevent excess leakage of oil to the combustion chamber of the cylinder, it is not the ultimate in attaining proper oil control. In order to reduce piston and ring wear and assist the oil ring in removing excess oil from the cylinder walls, it is now proposed to provide an oil land having a high unit pressure area on the lower surface of the piston below the last oil ring. This land will aid in reducing piston and ring wear and will result in a better fit between the piston and the cylinder wall.

In the drawing:

Figure 1 is a partial sectional view of an internal combustion engine showing a piston in position in one of the engine cylinders and embodying the invention, the view having parts broken away and in section.

Figure 2 is an enlarged view of the piston shown in Figure 1 with parts broken away and in section.

The internal combustion engine 10 may include a cylinder bank 12 having a cylinder wall 14 formed therein and receiving a piston 16. The open end of the cylinder defined by the wall 14 is closed by a cylinder head 18 which cooperates with the block and piston to form a combustion chamber 20. Piston 16 may be of any conventional type and is shown with a piston head 22 having spaced lands 24 and grooves 26 which form scuff bands. Recesses may be provided to receive compression rings 28 and 30 and oil ring 32. The land 34 is preferably located adjacent the lower ring and formed with a wide root section 38 and narrow and comparatively sharp edge 36 which closely fits the cylinder wall. The piston diameter at edge 36 is preferably of equal or a slightly less dimension than the diameter of the cylinder in which the piston is located. The edge 36 will rapidly wear to the shape of the cylinder bore during the break-in period. Even after the break-in period, the clearance established between land 36 and cylinder wall 14 will be small enough to produce a high unit pressure area immediately below oil ring 32. The land will therefore tend to wipe the excess oil from the cylinder wall and assist oil ring 32 in its functions. The loads on the oil ring will therefore be less and a more effective removal of the oil from the cylinder walls will be attained.

In order to obtain efficient performance from the oil land, it is preferred to form the sharp edge 36 by beveling either side of land 34 to give the land a tapered cross-section. When, for example, a 15° bevel is used on the upper side and a 30° bevel on the lower side, experiments have shown that the land will perform effectively. The invention is not limited to these angles, however, since other bevel angles will also give satisfactory results. The surface area presented to the cylinder wall by the sharp edge 36 should be relatively small in comparison to the thickness of the land root section 38 as well as the thickness of the oil ring 32 in order to obtain a high unit pressure area.

A land on an internal combustion engine piston has been disclosed which improves the operation of the piston and reduces wear on both the piston and the piston rings. It also aids the oil ring or rings in their functions.

What is claimed is:

1. A piston for an internal combustion engine, said piston having an oil ring groove and a land having a peripheral edge formed thereon adjacent said groove, said land forming one wall of said groove with an annular portion of said wall being beveled away from said groove, said land peripheral edge thereby having less area than the land root and constituting a high unit pressure area adapted to contact the cylinder wall of said engine.

2. In an internal combustion engine piston having grooves for receiving oil and compression rings, said grooves being defined by lands adjacent thereto, a land adjacent one of said grooves, said land having oppositely beveled upper and lower surfaces and a peripheral surface, said peripheral surface forming a high unit pressure area adapted to contact the cylinder wall of said engine.

3. An internal combustion engine piston having an oil land and an oil ring groove formed thereon, said land havin gan upper surface forming the lower wall of said groove and including a flat annular portion and a beveled annular portion and further having a lower surface formed with an annular beveled portion cooperating with said upper surface beveled portion to define a high unit pressure land peripheral surface.

4. A radially tapered land for an internal combustion engine piston having a root section and a peripheral edge with an intermediate section having upper and lower beveled surfaces, said peripheral edge being reduced in area relative to said root section whereby said land is adapted to contact an engine cylinder wall at a high unit pressure.

5. A piston having a piston head and a peripheral surface and adapted to reciprocate in a cylinder wall adjacent said peripheral surface and including scuff bands and lands forming grooves adapted to receive piston rings therein, one of said grooves being an oil ring groove adapted to receive an oil ring and spaced farther from said piston head than said other grooves, said oil ring groove having a beveled lower wall section forming a high unit pressure land immediately adjacent said groove, said land being also beveled on its lower surface and adapted to contact said cylinder wall and assist said oil ring.

References Cited in the file of this patent

UNITED STATES PATENTS

| | | |
|---|---|---|
| 1,462,501 | Barwald | July 24, 1923 |
| 2,344,416 | Scheibe | Mar. 14, 1944 |
| 2,352,592 | Alexandrescu | July 4, 1944 |